United States Patent
Kobayashi

(10) Patent No.: US 9,164,366 B2
(45) Date of Patent: Oct. 20, 2015

(54) PROJECTOR

(75) Inventor: Kazu Kobayashi, Kai (JP)

(73) Assignee: Seiko Epson Corporation, Tokyo (JP)

( * ) Notice: Subject to any disclaimer, the term of this patent is extended or adjusted under 35 U.S.C. 154(b) by 814 days.

(21) Appl. No.: 13/349,715

(22) Filed: Jan. 13, 2012

(65) Prior Publication Data

US 2012/0188517 A1  Jul. 26, 2012

(30) Foreign Application Priority Data

Jan. 21, 2011 (JP) ................... 2011-010575

(51) Int. Cl.
*G03B 21/00* (2006.01)
*G03B 21/20* (2006.01)
*H04N 9/31* (2006.01)
*G02F 1/13363* (2006.01)

(52) U.S. Cl.
CPC .......... *G03B 21/2073* (2013.01); *H04N 9/3105* (2013.01); *H04N 9/3167* (2013.01); *G02F 1/13363* (2013.01)

(58) Field of Classification Search
CPC ....... G02F 1/1335; G03B 21/14; G03B 21/22
USPC ................... 353/31; 349/119, 117, 7
See application file for complete search history.

(56) References Cited

U.S. PATENT DOCUMENTS

| 2003/0193636 A1 | 10/2003 | Allen et al. |
| 2005/0083464 A1 | 4/2005 | Allen et al. |
| 2006/0066813 A1* | 3/2006 | Okuyama et al. ............... 353/31 |
| 2006/0092358 A1* | 5/2006 | Fujii et al. ..................... 349/119 |
| 2006/0221286 A1 | 10/2006 | Allen et al. |
| 2007/0146596 A1 | 6/2007 | Fujii |
| 2007/0258029 A1* | 11/2007 | Nakagawa et al. ........... 349/119 |
| 2008/0174741 A1* | 7/2008 | Yanagisawa et al. ........... 353/31 |
| 2009/0128719 A1 | 5/2009 | Tateno |
| 2009/0244412 A1 | 10/2009 | Tsukagoshi |
| 2010/0026918 A1 | 2/2010 | Nakagawa et al. |

FOREIGN PATENT DOCUMENTS

| JP | 2005-523469 A | 8/2005 |
| JP | 2005-250240 A | 9/2005 |
| JP | 2006-171328 A | 6/2006 |
| JP | 2006-189677 A | 7/2006 |
| JP | 2007-178536 A | 7/2007 |
| JP | 2009-145862 A | 7/2009 |
| JP | 2009-145863 A | 7/2009 |
| JP | 2009-178899 A | 8/2009 |
| WO | WO-2008-078764 A | 7/2008 |
| WO | WO-2008-81919 A | 7/2008 |

* cited by examiner

*Primary Examiner* — William C Dowling
*Assistant Examiner* — Jerry Brooks
(74) *Attorney, Agent, or Firm* — ALG Intellectual Property, LLC

(57) ABSTRACT

A projector includes a lighting device that emits light of a plurality of colors, a plurality of vertical alignment mode reflex-type liquid crystal light valves that modulate the color light, a phase difference compensation plate including a C-plate and an O-plate provided between the lighting device and the liquid crystal light valve, a color synthesizing element that synthesizes the color light after modulation, and a projection optical system that projects the synthesized light to a projection target face, and a front side phase difference value of the phase difference compensation plate corresponding to at least one liquid crystal light valve is different from a front side phase difference value of the other liquid crystal light valves.

13 Claims, 9 Drawing Sheets

PROJECTOR

BACKGROUND

1. Technical Field

The present invention relates to a projector.

2. Related Art

Recently, a projector provided with a vertical alignment (hereinafter, also referred to as VA) mode liquid crystal light valve, in which contrast when viewed from the front side is excellent, has been proposed. In the VA mode liquid crystal light valve, a liquid crystal layer having negative permittivity anisotropy is interposed between a pair of substrates, and liquid crystal molecules are aligned in a substantially vertical direction in a state where voltage is not applied. However, even when such a VA mode liquid crystal light valve is used, contrast is decreased and display quality is decreased when viewed from an oblique direction.

In the related art, compensation of the phase difference of light obliquely passing through the liquid crystal layer is performed, using a phase difference compensation element having an optical axis along a thickness direction, a so-called C-plate. In this case, the C-plate is obliquely disposed such that the optical axis of the C-plate is parallel to a pre-tilt direction of liquid crystal molecules, to compensate the front side phase difference of liquid crystal by the C-plate. In this case, a fixture for disposing the C-plate in an oblique posture is necessary.

However, when positional disclination (disclination of inclination angle) of the oblique fixture or disclination of an orientation angle of liquid crystal alignment occurs, it is difficult to perform sufficient phase difference compensation only by inclining the C-plate. When a gap occurs in a cell thickness of a liquid crystal panel, it is necessary to adjust the front side phase difference of the liquid crystal panel with the inclination angle of the C-plate. However, in this case, an effective retardation of the C-plate deviates from the optimal condition, and it is difficult to perform the sufficient phase difference compensation. As the pre-tilt angle of the liquid crystal molecules gets larger, the inclination angle of the C-plate gets larger. However, a difference of reflexibility between P-polarization light and S-polarization light in incident polarization light occurs, and the axis of the incident polarization light deviates to decreases the contrast.

It is proposed that higher phase difference compensation is performed using a phase difference compensation element having biaxial refractive index anisotropy in addition to such a C-plate, a so-called O-plate, to raise the contrast (for example, see JP-A-2009-145862).

In the projector described in JP-A-2009-145862, the C-plate and the O-plate are disposed on the light emission side of the liquid crystal panel. However, merely by disposing the C-plate and the O-plate on the light emission side of the liquid crystal panels for red light modulation, green light modulation, and blue light modulation, a phenomenon in which black display becomes slightly bright, so-called black floating occurs, and thus it is difficult to sufficiently improve the contrast.

SUMMARY

An advantage of some aspects of the invention is to provide a projector capable of sufficiently improving contrast by suppressing black floating as much as possible.

According to an aspect of the invention, there is provided a projector including: a lighting device that emits light of a plurality of different colors; a plurality of vertical alignment mode reflex-type liquid crystal light valves that modulate the light of the plurality of colors; a phase difference compensation plate that is provided between the light device and the liquid crystal light valves, and includes a first phase difference compensation layer having negative uniaxial refractive index anisotropy in which an optical axis is taken along a thickness direction, and a second phase difference compensation layer having biaxial refractive index anisotropy; a color synthesizing optical system that synthesizes the color light modulated by the plurality of liquid crystal light valves; and a projection optical system that projects the light synthesized by the color synthesizing optical system, to a projection target face, wherein a front side phase difference value of the phase difference compensation plate corresponding to at least one liquid crystal light valve of the plurality of liquid crystal light valves is different from a front side phase difference value of the phase difference compensation plate corresponding to the other liquid crystal light valves.

In the projector provided with the plurality of liquid crystal light valves that modulate light of different colors, generally, terms and conditions such as the front side phase difference value of the phase difference compensation plate and the disposition of the optical axis are optimized in any one liquid crystal light valve, and the other liquid crystal light valves are matched thereto. However, wavelengths of light modulated by the liquid crystal light valves are different, wavelength dispersions of liquid crystal and the phase difference compensation plate are different, and thus it was difficult to perform the optimal phase difference compensation on all the liquid crystal light valves. For this reason, the black floating occurs in the liquid crystal light valves other than the liquid crystal light valve that is the standard of optimization. As a result, there is a problem that the contrast of the image obtained from the synthesized light after the color light is synthesized is decreased.

In the projector of the invention, the front side phase difference value of the phase difference compensation plate corresponding to at least one liquid crystal light valve of the plurality of liquid crystal light valves is different from the front side phase difference value of the phase difference compensation plate corresponding to the other liquid crystal light valve. Accordingly, it is possible to perform the optimal phase difference compensation on all the liquid crystal light valves, the occurrence of the black floating is suppressed, and it is possible to improve the contrast.

In the projector of the invention, it is preferable that the plurality of liquid crystal light valves be a red light modulating liquid crystal light valve, a green light modulating liquid crystal light valve, and a blue light modulating liquid crystal light valve, and the front side phase difference value of the phase difference compensation plate corresponding to the red light modulating liquid crystal light valve be larger than the front side phase difference value of the phase difference compensation plate corresponding to the green light modulating liquid crystal light valve, and the front side phase difference value of the phase difference compensation plate corresponding to the blue light modulating liquid crystal light valve be smaller than the front side phase difference value of the phase difference compensation plate corresponding to the green light modulating liquid crystal light valve.

The wavelength dispersion of the liquid crystal layer of the liquid crystal light valve has characteristics in which the front side phase difference is large on the long wavelength side and the front side phase difference is small on the short wavelength side. Accordingly, when the front side phase difference value of the red light phase difference compensation plate is larger than the front side phase difference value of the green light phase difference compensation plate and the front side phase difference value of the blue light phase difference compensation plate is smaller than the front side phase difference value of the green light phase difference compensation plate, it is possible to perform the optimal phase difference compensation on all the liquid crystal light valves.

According to another aspect of the invention, there is provided a projector including: a lighting device that emits light of a plurality of different colors; a plurality of vertical alignment mode reflex-type liquid crystal light valves that modulate the light of a plurality of colors; a phase difference compensation plate that is provided between the light device and the liquid crystal light valves, and includes a first phase difference compensation layer having negative uniaxial refractive index anisotropy in which an optical axis is taken along a thickness direction, and a second phase difference compensation layer having biaxial refractive index anisotropy; a color synthesizing optical system that synthesizes the color light modulated by the plurality of liquid crystal light valves; and a projection optical system that projects the light synthesized by the color synthesizing optical system, to a projection target face, wherein an orientation angle of a slow phase axis in an in-plane orientation of the phase difference compensation plate corresponding to at least one liquid crystal light valve of the plurality of liquid crystal light valves is different from an orientation angle of a slow phase axis in an in-plane orientation of the phase difference compensation plate corresponding to the other liquid crystal light valves.

In the projector of the aspect of the invention, the orientation angle of the slow phase axis viewed in the thickness direction of the phase difference compensation plate corresponding to at least one liquid crystal light valve of the plurality of liquid crystal light valves is different from the orientation angle of the slow phase axis viewed in the thickness direction of the phase difference compensation plate corresponding to the other liquid crystal light valve. Accordingly, it is possible to perform the optimal phase difference compensation on all the liquid crystal light valves, the occurrence of the black floating is suppressed, and it is possible to improve the contrast.

In the projector of the invention, it is preferable that the plurality of liquid crystal light valves be a red light modulating liquid crystal light valve, a green light modulating liquid crystal light valve, and a blue light modulating liquid crystal light valve, a polarized beam splitter having a predetermined transmission axis be provided between the lighting device and the phase difference compensation plate, an angle formed by the slow phase axis of the phase difference compensation plate corresponding to the red light modulating liquid crystal light valve and the transmission axis be larger than an angle formed by the slow phase axis of the phase difference compensation plate corresponding to the green light modulating liquid crystal light valve and the transmission axis, and an angle formed by the slow phase axis of the phase difference compensation plate corresponding to the blue light modulating liquid crystal light valve and the transmission axis be smaller than an angle formed by the slow phase axis of the phase difference compensation plate corresponding to the green light modulating liquid crystal light valve and the transmission axis.

It is general that the angle formed by the slow phase axis of the phase difference compensation plate and the transmission axis of the polarized beam splitter (hereinafter, referred to as PBS) is set to a small angle of about 0° to 10°.

BRIEF DESCRIPTION OF THE DRAWINGS

The invention will be described with reference to the accompanying drawings, wherein like numbers reference like elements.

FIG. 10A shows a case where optimization is not performed, and FIG. 10B shows a case where optimization is performed.

FIG. 11A shows a case where optimization is not performed, and FIG. 11B shows a case where optimization is performed.

FIG. 13A shows a case where optimization is not performed, and FIG. 13B shows a case where optimization is performed.

FIG. 14A shows a case where optimization is not performed, and FIG. 14B shows a case where optimization is performed.

DESCRIPTION OF EXEMPLARY EMBODIMENTS

First Embodiment

Hereinafter, a first embodiment of the invention will be described with reference to FIG. 1 to FIG. 11B.

In the embodiment, a projector provided with three sheets of the reflex-type liquid crystal light valves, that is, a so-called 3-sheet-type liquid crystal projector will be described by way of example.

Figure 1:
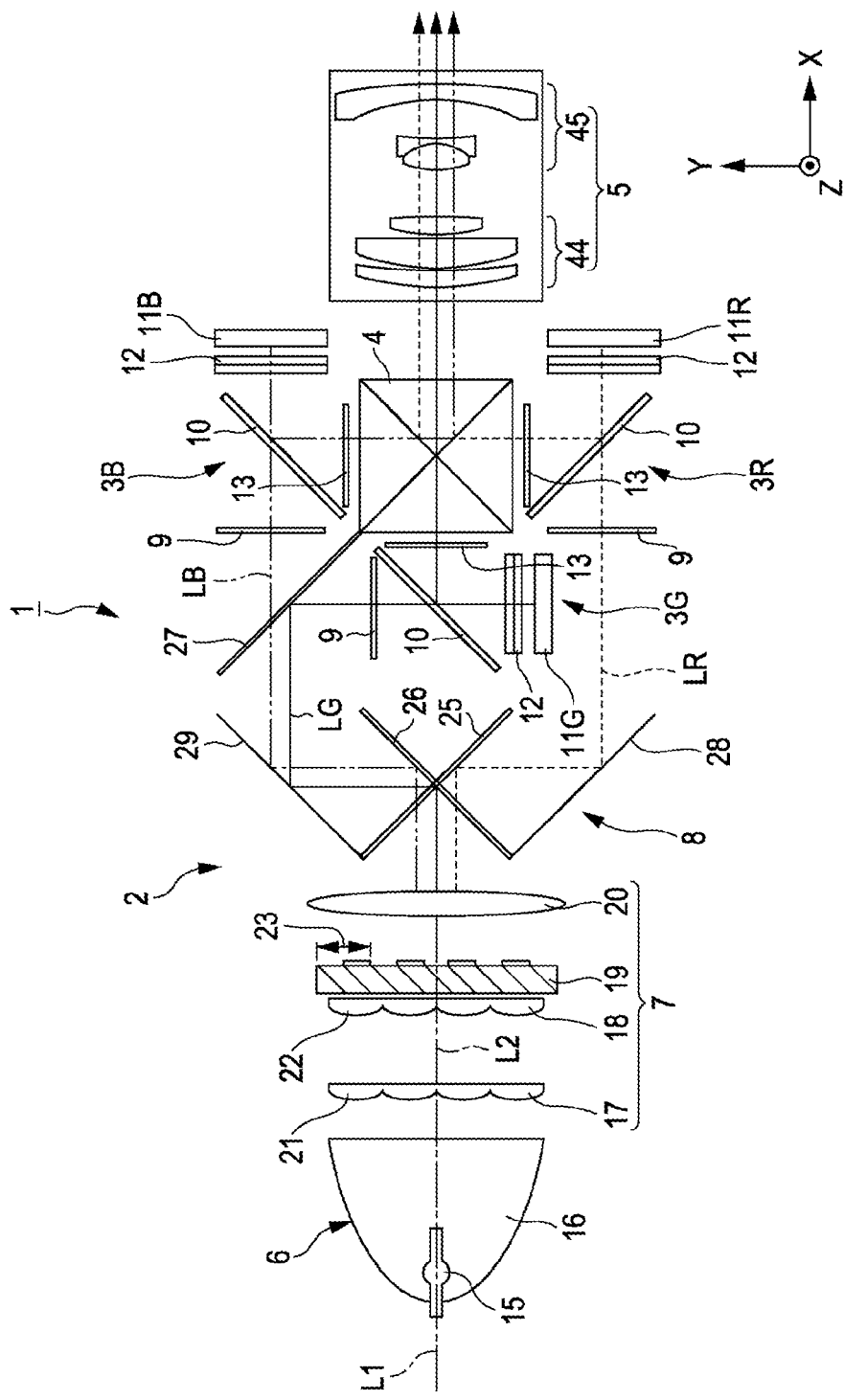
FIG. 1 is a diagram illustrating a schematic configuration of a projector according to a first embodiment of the invention.
Figure 2:
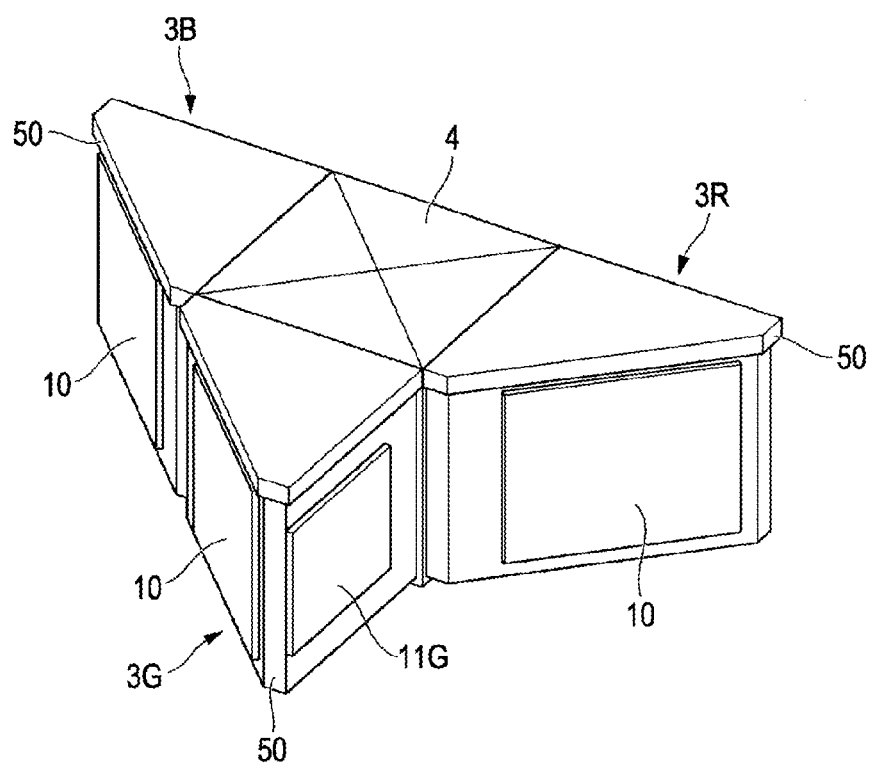
FIG. 2 is a perspective view illustrating a configuration around a liquid crystal light valve of the projector.
Figure 3:
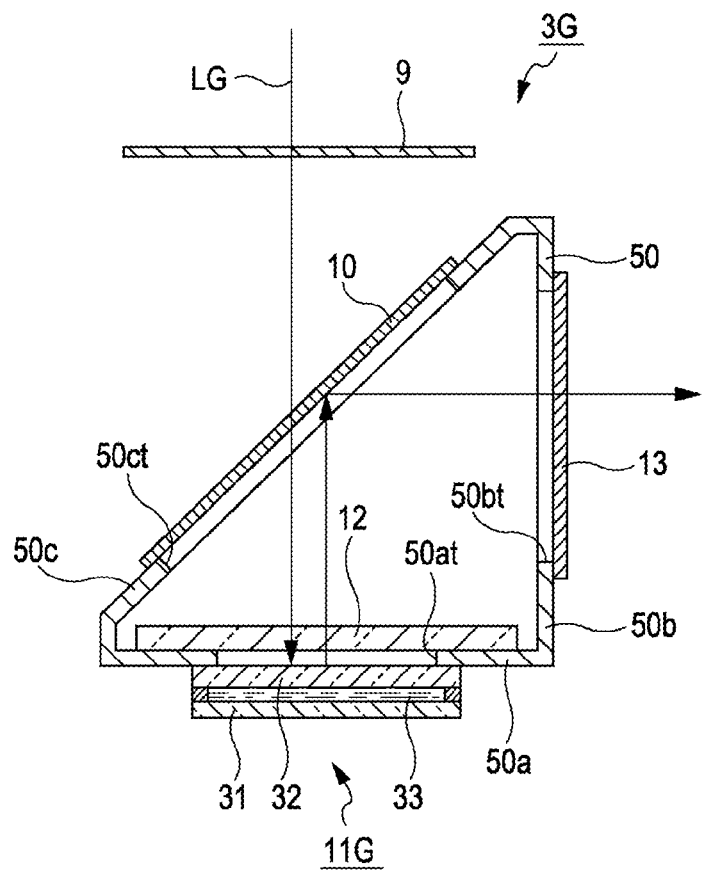
FIG. 3 is a cross-sectional view illustrating a triangular prism unit housing the liquid crystal light valve.

FIG. 1 is a diagram illustrating a schematic configuration of the projector according to the embodiment. FIG. 2 is a perspective view illustrating a configuration around a liquid crystal light valve of the projector. FIG. 3 is a cross-sectional view illustrating a triangular prism housing the liquid crystal light valve.

In the following drawings, so that constituent elements may be easily viewed, a scale of the dimensions may be differently indicated according to the constituent elements.

As shown in FIG. 1, the projector 1 of the embodiment includes a lighting device 2 that emits 3-color light formed of red light (R light), green light (G light), and blue light (B light), three sets of image forming optical systems 3R, 3G, and 3B that form images based on the color light, a color synthesizing element 4 (color synthesizing optical system) that synthesizes 3-color light, and a projection optical system 5 that projects the synthesized light to a projection target face (not shown) such as a screen. The lighting device 2 includes a light source 6, an integrator optical system 7, and a color separation optical system 8. The image forming optical systems 3R, 3G, and 3B includes an incident side polarization plate 9, a PBS 10 (hereinafter, referred to as "PBS"), reflex-type liquid crystal light valves 11R, 11G, and 11B, a phase difference compensation plate 12, and an emission side polarization plate 13.

Briefly, the projector 1 operates as follows.

White light emitted from the light source 6 enters the integrator optical system 7. Illuminance of the white light entering the integrator optical system 7 becomes uniform, and the white light is emitted in which the polarization state can be matched with predetermined linearly polarized light. The white light emitted from the integrator optical system 7 is separated into color light of R, G, and B by the color separation optical system 8, and enters the sets of image forming optical systems 3R, 3G, and 3B different for each color light. The color light entering the image forming optical systems 3R, 3G, and 3B becomes modulation light modulated on the basis of image signals of images to be displayed. The 3-color modulation light emitted from three sets of image forming optical systems 3R, 3G, and 3B is synthesized into multi-color light by the color synthesizing element 4, and enters the projection optical system 5. The multi-color light entering the projection optical system 5 is projected to the projection target face such as a screen. As described above, a full-color image is displayed on the projection target face.

Hereinafter, constituent elements of the projector 1 will be described in more detail.

The light source 6 includes a light source lamp 15 and a paraboloidal reflector 16. The light emitted from the light source lamp 15 is reflected in one direction by the paraboloidal reflector 16 to be substantially parallel light flux, and enters the integrator optical system 7 as the light source light. The light source lamp 15 is configured by, for example, a metal halide lamp, a xenon lamp, a high pressure mercury lamp, and a halogen lamp. The reflector may be configured by an oval reflector or a spherical reflector, instead of the paraboloidal reflector 16. A parallelism lens making the light emitted from the reflector parallel according to the shape of the reflector may be used.

The integrator optical system 7 includes a first lens array 17, a second lens array 18, a polarization conversion element 19, and a superposing lens 20. The first lens array 17 includes a plurality of micro-lenses 21 arranged on a face substantially perpendicular to an optical axis L1 of the light source 6. The second lens array 18 includes a plurality of micro-lenses 22 in the same manner as the first lens array 17. The micro-lenses 21 and 22 are arranged in matrix, and the plan shape on the plane perpendicular to the optical axis L1 is a shape (a substantially rectangular shape) similar to a lighting target area of the liquid crystal light valves 11R, 11G, and 11B. The lighting target area is an area in which a plurality of pixels are arranged in matrix in the liquid crystal light valves 11R, 11G, and 11B to substantially contribute to display.

The polarization conversion element 19 includes a plurality of polarization conversion units 23. Although not showing a detail structure, each polarization conversion unit 23 includes a polarization separation film (hereinafter, referred to as PBS film), a ½ phase plate, and a reflection mirror. The micro-lenses 21 of the first lens array 17 correspond, one-to-one, to the micro-lenses 22 of the second lens array 18. The micro-lenses 22 of the first lens array 18 correspond, one-to-one, to the polarization conversion units 23 of the polarization conversion unit 19.

The light source light entering the integrator optical system 7 is spatially divided and enters the plurality of micro-lenses 21 of the first lens array 17, and is collected for each light flux entering the micro-lens 21. The light source light collected by each micro-lens 21 forms an image on the micro-lens 22 of the second lens array 18 corresponding to the micro-lens 21. That is, a secondary light source image is formed on each of the plurality of micro-lenses 22 of the second lens array 18. The light from the secondary light source image formed on the micro-lens 22 enters the polarization conversion unit 23 corresponding to the micro-lens 22.

The light entering the polarization conversion unit 23 is divided into p-polarization light and s-polarization light with respect to the PBS film. The divided polarization light (for example, the S-polarization light) is reflected by the reflection mirror, then passes through the ½ phase plate, thus the polarization state is converted, and can be matched with one side polarization light (for example, the P-polarization light). Herein, the polarization state of the light passing through the polarization conversion unit 23 can be matched with the polarization state of passing through the incident side polarization plate 9 to be described later. The light emitted from the plurality of polarization conversion units 23 is superposed on the lighting target area of the liquid crystal light valves 11R, 11G, and 11B by the superposition lens 20. The light flux spatially divided by the first lens array 17 illuminates substantially the whole area of the lighting target area, the illuminance distribution is averaged, and the illuminance on the lighting target area becomes uniform.

The color separation optical system 8 includes a first dichroic mirror 25 having a wavelength selection face, a second dichroic mirror 26, a third dichroic lens 27, a first reflection mirror 28, and a second reflection mirror 29. The first dichroic mirror 25 has spectrum characteristics of reflecting the red light LR and transmitting the green light LG and the blue light LB. The second dichroic mirror 26 has spectrum characteristics of reflecting the red light LR and transmitting the green light LG and the blue light LB. The third dichroic mirror 27 has spectrum characteristics of reflecting the green light LG and transmitting the blue light LB. The first dichroic mirror 25 and the second dichroic mirror 26 are disposed such that the wavelength selection faces thereof are substantially perpendicular to each other and the wavelength selection faces forms an angle of about 45° with respect to the optical axis L2 of the integrator optical system 7.

The red light LR, the green light LG, and the blue light LB included in the light source light entering the color separation optical system 8 are separated as described above, and enter the image forming optical systems 3R, 3G, and 3B corresponding to the separated color light. That is, the red light LR passes through the second dichroic mirror 26, is reflected by the first dichroic mirror 25, then is reflected by the first reflection mirror 28, and enters the red liquid crystal light valve 3R. The green light LG passes through the first dichroic mirror 25, is reflected by the second dichroic mirror 26, then is reflected by the second reflection mirror 29, is reflected by the third dichroic mirror 27, and enters the green liquid crystal light valve 3G. The blue light LB passes through the first dichroic mirror 25, is reflected by the second dichroic mirror 26, then is reflected by the second reflection mirror 29, passes through the third dichroic mirror 27, and enters the blue liquid crystal light valve 3B. The color light modulated by the image forming optical systems 3R, 3G, and 3B enters the color synthesizing element 4.

The color synthesizing element 4 is configured by a dichroic prism. The dichroic prism has a structure in which four triangular prisms are bonded to each other. A face bonded to the triangular prisms is an inner face of the dichroic prism. In the inner face of the dichroic prism, a mirror face reflecting the red light LR and allowing the green light LG to pass and a mirror face reflecting the blue light LB and allowing the green light LG to pass are formed to be perpendicular. The green light LG entering the dichroic prism straightly goes to the mirror face and is emitted. The red light LR and the blue light LB entering the dichroic prism are selectively reflected or transmitted on the mirror face, and are emitted in the same direction as the emission direction of the green light LG. As described above, three color light (images) are superposed and synthesized, and the synthesized color light is enlarged and projected on the screen 7 by the projection optical system 5. The projection optical system 5 includes a first lens group 44 and a second lend group 45.

In the embodiment, as shown in FIG. 2, all of the red light image forming optical system 3R, the green light image forming optical system 3G, and the blue light image forming optical system 3B are units, and have the same configuration. Three image forming optical systems 3R, 3G, and 3B as the units are integrated on three optical incident faces of the color synthesizing element 4.

Herein, a configuration of the green light image forming optical system 3G will be described as a representative of the image forming optical systems.

As shown in FIG. 3, the green light image forming optical system 3G includes the incident side polarization plate 9, the PBS 10, the green liquid crystal light valve 11G, the phase difference compensation plate 12, and the emission side polarization plate 13. Among the constituent elements, the PBS 10, the green liquid crystal light valve 11G, the phase difference compensation plate 12, and the emission side polarization plate 13 are fixed to a case 50 having a substantially triangular prism shape, except for the incident side polarization plate 9. The case 50 is formed of a material with high thermal conductivity such as aluminum.

Opening portions 50at, 50bt, and 50ct allowing light to pass are formed on three sides 50a, 50b, and 50c of the case 50, respectively. Two sides coming in perpendicular contact with each other of three sides 50a, 50b, and 50c of the case 50 are a first side 50a and a second side 50b, and a side coming in contact with the first side 50a and the second side 50b at 45° is a third face 50c. The green liquid crystal light valve 11G is fixed to the outside of the first side 50a to close the opening portion 50at, and the phase difference compensation plate 12 is fixed to the inside of the first side 50a to close the opening portion 50at. The emission side polarization plate 13 is fixed to the outside of the second side 50b to close the opening portion 50bt. The PBS 10 is fixed to the outside of the third side 50c to close the opening portion 50ct. With such a configuration, the inside of the case 50 is a sealed space.

In the green light image forming optical system 3G, the green light LG separated from the light source light enters the incident side polarization plate 9. The incident side polarization plate 9 allows the linear polarization light vibrating in a predetermined direction to pass, and the transmission axis is set to allow the P-polarization light for the polarization separation face of the PBS 10 to be described later. Hereinafter, the P-polarization light for the polarization separation face of the PBS 10 is merely referred to as P-polarization light, and the S-polarization light for the polarization separation face of the PBS 10 is merely referred to as S-polarization light. As described above, in the light source light passing through the integrator optical system 7, the polarization state can be parallel to the P-polarization light, and thus most of the green light LG passes through the incident side polarization plate 9 and enters the PBS 10.

The PBS 10 of the embodiment is a wire grid type PBS, and is configured by, for example, a glass substrate and a plurality of metal wires formed thereon (not shown). All the plurality of metal wires extend in one direction (Z direction), and are separated parallel to each other and are formed on the glass substrate. A main face of the glass substrate on which the plurality of metal wires are formed becomes the polarization separation face, the extending direction of the plurality of metal wires is the reflection axis direction, and the arrangement direction of the plurality of metal wires is the transmission axis direction. The polarization separation face forms an angle of about 45° with respect to the center axis of the green light LG entering the polarization separation face. The S-polarization light, the polarization direction of which coincides with the reflection axis, of the green light LG entering the polarization separation face is reflected on the polarization separation face, and the P-polarization light, the polarization direction of which coincides with the transmission axis direction, passes through the polarization separation face. Since the green light LG becomes substantially the P-polarization light by the operation of the polarization conversion element 19 and the incident side polarization plate 9 of the integrator optical system 7, most of the green light LG passes through the polarization separation face of the PBS 10 and enters the green light liquid crystal light valve 11G. It is preferable that the incident side polarization plate 9 and the emission side polarization plate 13 be configured by a wire grid type polarization plate in consideration of heat resistance and the like.

The green liquid crystal light valve 11G of the embodiment is a reflex type liquid crystal cell, and a liquid crystal mode is a vertical alignment mode. As shown in FIG. 3, the green liquid crystal light valve 11G includes a TFT array substrate 31 and an opposed substrate 32 which are opposed to each other, and a liquid crystal layer 33 interposed between two substrates. The liquid crystal layer 33 is formed of a liquid crystal material having negative permittivity anisotropy.

The optical compensation plate 12 is provided between the PBS 10 and the green liquid crystal light valve 11G. The detailed configuration of the phase difference compensation plate 12 will be described later. The green light LG passing through the PBS 10 sequentially passes through the phase difference compensation plate 12, the green liquid crystal light valve 11G, and the opposed substrate 32, enters the liquid crystal layer 33, then is reflected on the TFT array substrate 31, and is turned back. The green light LG is modulated to modulation light while passing through the liquid crystal layer 33, and sequentially passes through the opposed substrate 32 and the optical compensation plate 12.

Figure 4:
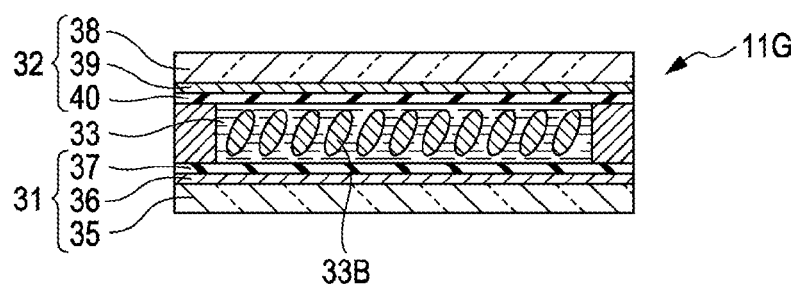
FIG. 4 is a cross-sectional view illustrating a schematic configuration of the liquid crystal light valve.

As shown in FIG. 4, on the substrate main body 35 constituting the TFT array substrate 31, a plurality of gate lines and a plurality of source lines are disposed to be perpendicular, and pixel electrode 36 are provided through TFT provided in the vicinity of intersection points of the gate lines and the source lines. In FIG. 4, constituent elements on the side lower than the pixel electrodes 36, such as the gate lines, the source lines, and the TFTs are not shown. The pixel electrode 36 is configured by metal with high light reflexibility such as aluminum, silver, and an alloy thereof, and serves as a reflection electrode. Meanwhile, a common electrode 39 formed of a transparent conductive material such as indium tin oxide (hereinafter, referred to as ITO) is provided on the substrate main body 38 constituting the opposed substrate 32.

An alignment film 37 is formed on the pixel electrodes 36 of the TFT array substrate 31. Similarly, an alignment film 40 is formed on the common electrode 39 of the opposed substrate 32. The alignment films 37 and 40 are formed by vacuum deposition of silicon oxide ($SiO_2$). For example, a vacuum degree of deposition at the time of vacuum deposition is $5 \times 10^3$ Pa, and a substrate temperature is 100° C. To apply anisotropy to the alignment film 37 and 40, deposition is performed in a direction of inclining from the substrate face by 45°. Accordingly, a column (pillar-shaped structure) of silicon oxide grows in a direction inclining from the substrate face by 70° in the same orientation as the deposition orientation. The alignment film 37 on the TFT array substrate 31 and the alignment film 40 on the opposed substrate 32 are disposed such that the alignment directions thereof are semi-parallel. The liquid crystal molecules 33B of the liquid crystal layer 33 are aligned to form a predetermined pre-tilt angle by the alignment films 37 and 40. When a work function difference of a material of the pixel electrode 36 and a material of the common electrode 39 is a cause of flickering or burn-in, an insulating film may be provided between the pixel electrodes 36 and the alignment film 37.

Figure 5A:
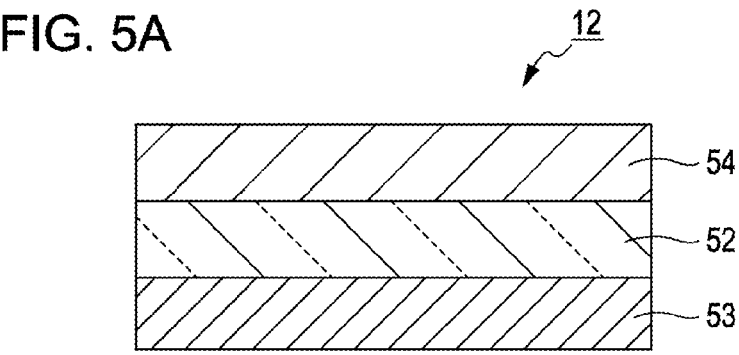
FIGS. 5A to 5C are cross-sectional views illustrating a schematic configuration of a phase difference compensation plate.

As shown in FIG. 5A, the phase difference compensation plate 12 is provided with a C-plate (a negative C-plate) 53 (a first phase difference compensation layer) on one face of a substrate 52 formed of quartz glass, and is provided with an O-plate 54 (a second phase difference compensation layer) on the other face. That is, in the embodiment, the C-plate 53 and the O-plate 54 are integrated. The phase difference compensation plate 12 with such a configuration is disposed parallel to the green liquid crystal light valve 11G such that the C-plate 53 is positioned on the green liquid crystal light valve 11G side and the O-plate 54 is positioned on the opposite side to the green liquid crystal light valve 11G.

The C-plate 53 is formed of a multilayer film in which a high refractive index layer and a low refractive index layer are alternately laminated on the substrate 52 by a sputtering method or the like, and is a double refractive index body having uniaxial negative refractive index anisotropy. The C-plate 53 has an optical axis perpendicular to the surface, and compensates the phase difference of oblique light emitted from the green liquid crystal light valve 11G. The high refractive index layer is formed of $TiO_2$ or $ZrO_2$ that is a relatively high refractive index dielectric, and the low refractive index layer is formed of $SiO_2$ or $MgF_2$ that is a low refractive index dielectric. In the C-plate 53 with such a configuration, it is preferable that a thickness of each refractive index layer be small to prevent the light passing through the C-plate 53 from being reflected and interfering between the layers.

Figure 6A:
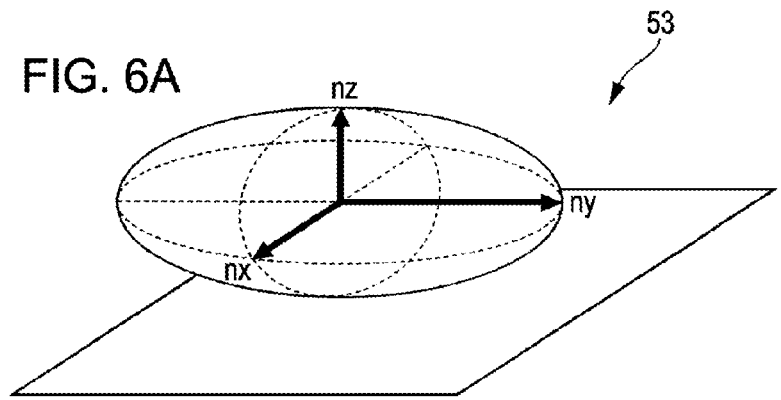
FIG. 6A is a schematic diagram illustrating optical anisotropy of a C-plate.

FIG. 6A is a schematic diagram illustrating optical anisotropy of the C-plate 53. As shown in FIG. 6A by a refractive index oval figure, a relationship of refractive indexes of directions of the C-plate 53 is nx=ny>nz, and it is difficult to compensate the phase difference since it is isotropic with respect to the light entering parallel to the optical axis of the C-plate 53. That is, it is difficult to compensate the phase difference with respect to the light entering from the green liquid crystal light valve 11G perpendicularly to the C-plate 53. Meanwhile, the phase difference is optically compensated with respect to light of an inclination component, that is, an inclination component of VA mode liquid crystal of the light emitted from the green liquid crystal light valve 11G. It is not necessary that the C-plate 53 completely satisfies nx=ny, the C-plate 53 may have a phase difference as little as possible, specifically, the front side phase difference may be about 0 nm to 3 nm.

As such a kind of C-plate 53, it is preferable that a thickness-direction phase difference Rth is preferably equal to or more than 100 nm and equal to or less than 300 nm, and more preferably 180 nm. The thickness direction phase difference Rth is defined by the following formula.

$$Rth = \{(nx+ny)/2 - nz\} \times d$$

In the formula, in the C-plate 53 shown in FIG. 6A, nx and ny indicate plane-direction main refractive indexes, and nz indicates the same thickness-direction main refractive index. In addition, d indicates the thickness of the C-plate 53.

Meanwhile, as shown in FIG. 5A, the O-plate 54 is formed by evaporation of an inorganic material such as $Ta_2O_5$ on one face of the substrate 52 formed of quartz glass. As microscopically viewed, the O-plate 54 has a film structure having a column (column-shaped structure) in which the inorganic material grows along the oblique direction. The inorganic film having such a structure causes the phase difference from the micro-structure.

Figure 6B:
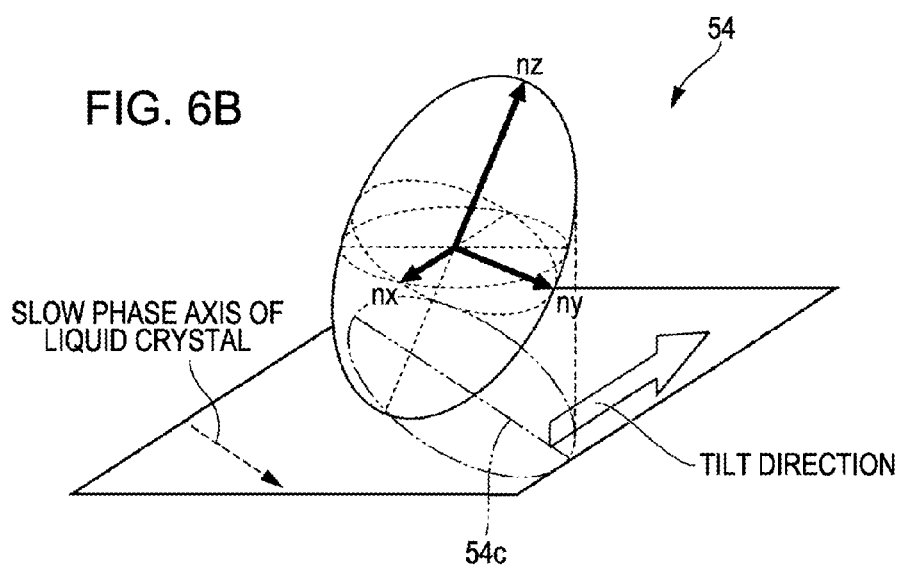
FIG. 6B is a schematic diagram illustrating optical anisotropy of an O-plate.

FIG. 6B is a schematic diagram illustrating optical anisotropy of the O-plate 54. As shown in FIG. 6B by a refractive index oval figure, a relationship of refractive indexes of directions of the O-plate 54 is nx<ny<nz, and is a double refractive index body having biaxial refractive index anisotropy. The O-plate 54 has a slow phase axis by the inorganic film provided with the column described above. The slow phase axis of the O-plate 54 coincides with the longest diameter 54c in the oval projected onto the substrate (substrate face) as viewing the refractive index oval figure shown in FIG. 6B in a normal line direction of the substrate.

Figure 7:
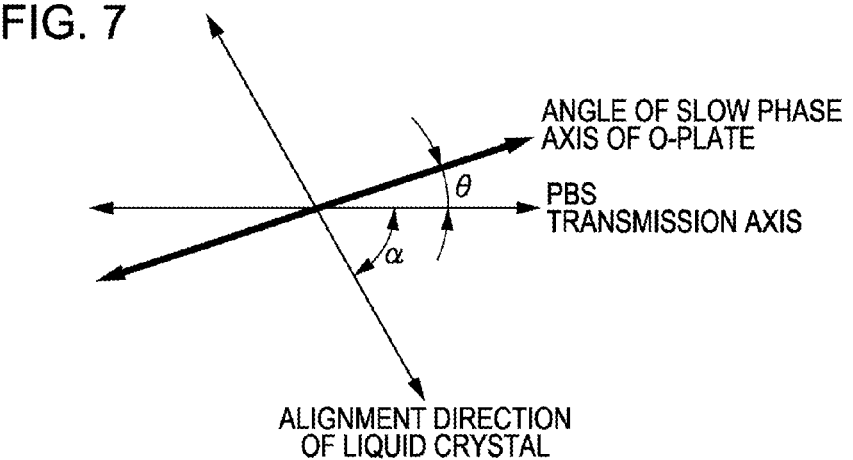
FIG. 7 is a diagram illustrating a relationship of optical axis disposition of constituent elements of an image forming optical system.

FIG. 7 is a diagram illustrating a relationship of the alignment direction of the liquid crystal molecules 33B, the transmission axis of the PBS 10, and the slow phase axis of the O-plate 54. As shown in FIG. 7, in the embodiment, as viewed in a direction along the optical axis, an angle α formed by the alignment direction of the liquid crystal molecules 33B and the transmission axis of the PBS 10 is set to, for example, 45°, and an angle θ formed by the transmission axis of the PBS 10 and the slow phase axis of the O-plate 54 is set to, for example, 3°.

As described above, the red light image forming optical system 3R, the green light image forming optical system 3G, and the blue light image forming optical system 3B have the common basic configuration, but there is a difference in the following part.

That is, in the embodiment, there is a difference in the front side phase difference value of the O-plate 54 of the phase difference compensation plate 12 in the image forming optical systems 3R, 3G, and 3B. Specifically, the front side phase difference value of the O-plate 54 of the phase difference compensation plate 12 in the red light image forming optical system 3R is set to, for example, 15.4 nm. The front side phase difference value of the O-plate 54 of the phase difference compensation plate 12 in the green light image forming optical system 3G is set to, for example, 15.0 nm. The front side phase difference value of the O-plate 54 of the phase difference compensation plate 12 in the blue light image forming optical system 3B is set to, for example, 14.1 nm.

The front side phase difference value Re is defined by the following formula.

$$Re = (nx - ny) \times d$$

In the formula, in the O-plate 54 shown in FIG. 6B, nx and ny indicate plate-direction main refractive indexes. In addition, d indicates the thickness of the O-plate 54.

Figure 8:
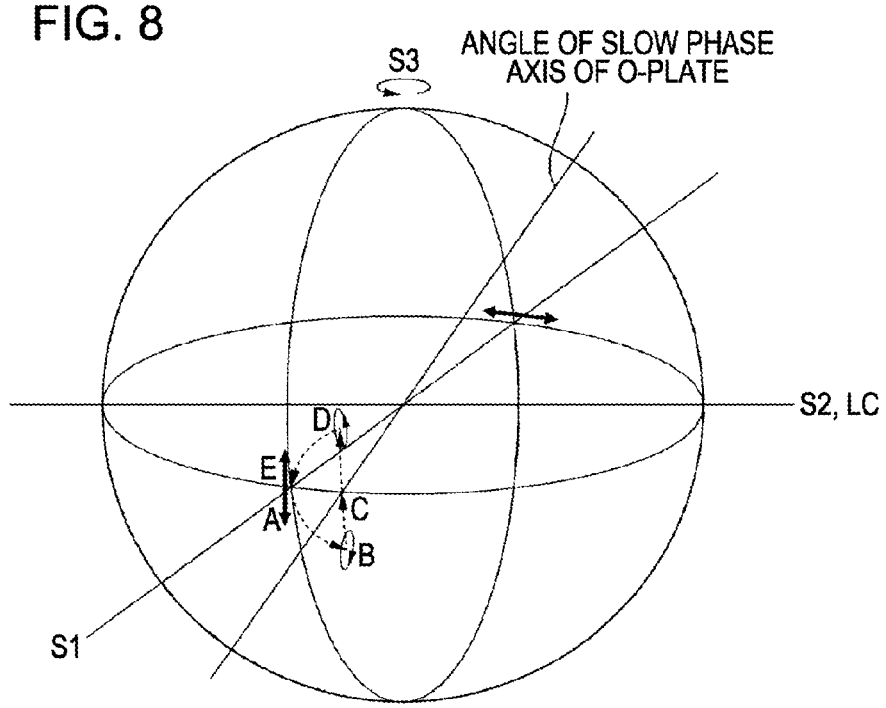
FIG. 8 is a diagram illustrating a Poincare sphere illustrating a principle of the invention.

Hereinafter, a phenomenon of the phase difference compensation by the phase difference compensation plate 12 will be described with reference to a Poincare sphere shown in FIG. 8.

The linear polarization light entering a point A that is an intersection between an axis S1 of the Poincare sphere and a sphere face passes through the O-plate 54, moves to a point B, and becomes, for example, right-hand rotation oval polarization light. Then, when the right-hand rotation oval polarization light passes through the liquid crystal layer 33 of the liquid crystal light valve 11G, the phase difference occurs by the pre-tilt influence of the liquid crystal molecules 33B, and the light moves to a point C on the S1-S2 plane. The light is reflected at the pixel electrode 36 of the liquid crystal light valve 11G. Then, when the light passes through the liquid crystal layer 33 again, the phase difference occurs by the pre-tilt influence of the liquid crystal molecules 33B, and the light moves to a point D and becomes a left-hand rotation oval polarization light. Then, the left-hand oval polarization light passes through the O-plate 54, and moves to a point E. When the point E coincides with the point A, the left-hand rotation oval polarization light returns to the linear polarization light, and the front side phase difference is completely compensated. It is ideal that all the image forming optical systems 3R, 3G, and 3B are in this state. In this state, the black floating is completely suppressed, and the contrast of display becomes the maximum. Herein, since the front side phase difference is discussed, the operation of the C-plate 53 does not work.

Figure 10A:
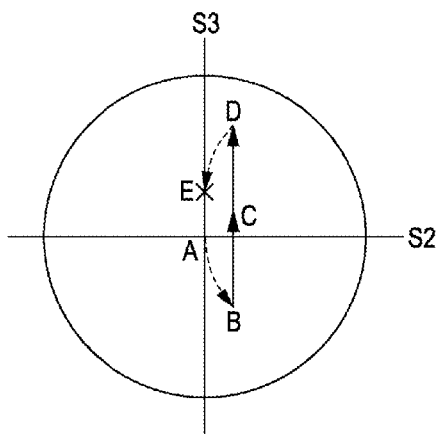
FIG. 10A and FIG. 10B are diagrams illustrating change of a polarization state of the Poincare sphere in a red light phase difference compensation plate.

However, actually, R, G, and B are different in wavelength from each other, liquid crystal and the O-plate has wavelength dispersion in refractive index anisotropy, and thus the point E does not coincide with the point A in the red light and blue light, for example, when the green light is a standard. For example, it is assumed that optimization of the phase difference compensation by the O-plate 54 is performed to be the ideal state shown in FIG. 8 as the standard of the green light, and the front side phase difference value of the O-plate 54 in the red light image forming optical system 3R is matched with the front side phase difference value of the O-plate 54 in the green light image forming optical system 3G. In this case, as for the red light, as shown in FIG. 10A, in the movement distance from the point A to the point B by the operation of the O-plate 54 on the Poincare sphere, the wavelength of red is longer than the wavelength of green, the influences of the wavelength dispersion overlap with each other in the refractive index anisotropy of the O-plate 54, and the movement distance becomes shorter than that of the green light. Then, the movement distance from the point B to the point C by the operation of the liquid crystal layer 33 and the movement distance from the point C to the point D become also shorter than that of the green light. However, since it is not the optimal value, the destination point of the point C is not the optimal value as shown in FIG. 10A. Then, the movement distance from the point D to the point E by the operation of the O-plate 54 becomes shorter than that of the green light. As a result, in the case of the red light, the point E does not return to the position of the point A. Accordingly, in this state, the black floating is not suppressed, and the contrast of display is decreased.

FIG. 9 to FIG. 11B described hereinafter show circles by projecting the sphere surface onto the S2-S3 plane, as viewing the Poincare sphere in the direction of the axis S1.

Figure 11A:
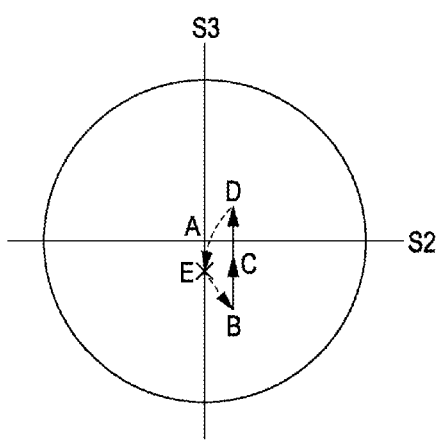
FIG. 11A and FIG. 11B are diagrams illustrating change of a polarization state of the Poincare sphere in a blue light phase difference compensation plate.

It is assumed that the front side phase difference value of the O-plate 54 in the blue light imaging forming optical system 3B is matched with the front side phase difference value of the O-plate 54 in the green light image forming optical system 3G. In this case, as shown in FIG. 11A, the movement distance from the point A to the point B by the operation of the O-plate 54 on the Poincare sphere becomes longer than the case of the green light. Then, the movement distance from the point B to the point C by the liquid crystal layer 33 and the movement distance from the point C to the point D become longer than the case of the green light. However, since it is not the optimal value, the destination point of the point C is not the optimal value as shown in FIG. 11A. The movement distance from the point D to the point E by the operation of the O-plate 54 becomes longer than the case of the green light. As a result, in the case of the blue light, the point E does not return to the position of the point A. Accordingly, in this state, the black floating is not suppressed, and the contrast of display is decreased.

Figure 9:
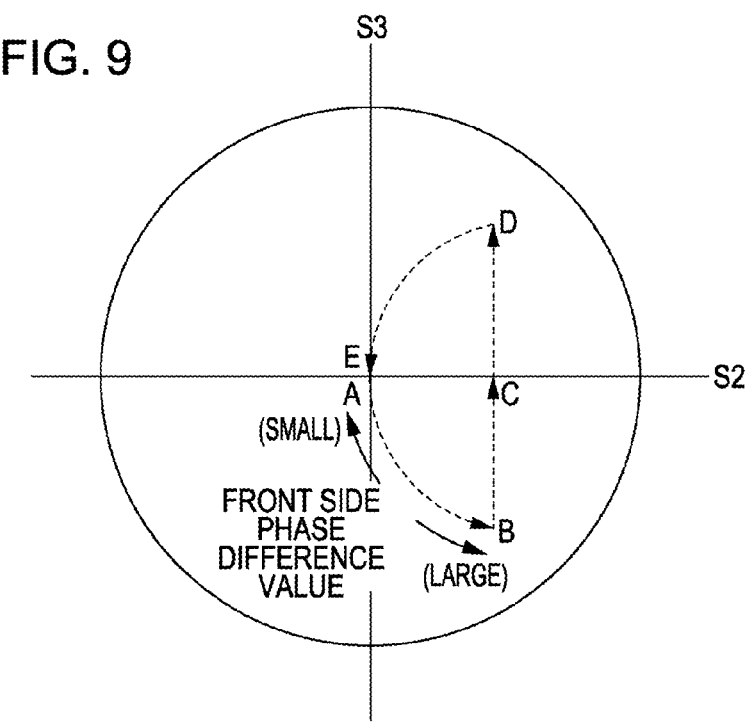
FIG. 9 is a front view illustrating a Poincare sphere viewed in an S1 axis direction, and is a diagram illustrating change of a polarization state of light of the Poincare sphere when a front phase difference value of the phase difference compensation plate is changed.

Herein, when the front side phase difference value of the O-plate 54 is changed in a direction of increasing the value, as shown in FIG. 9, the movement distance from the point A to the point B becomes long on the same curve connecting between the point A and the point B of the Poincare sphere. Meanwhile, when the front side phase difference value of the O-plate 54 is changed in a direction of decreasing the value, the movement distance from the point A to the point B becomes short on the same curve connecting between the point A and the point B of the Poincare sphere.

Figure 10B:
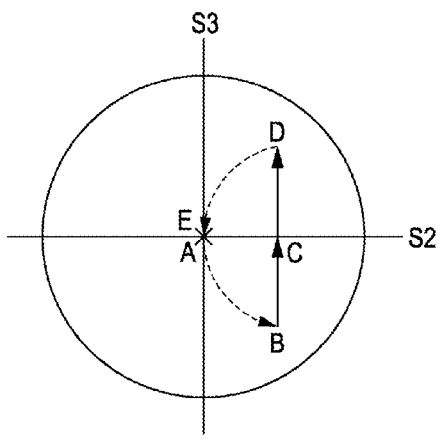

According to the phenomenon described above, the front side phase difference value of the O-plate 54 in the red light image forming optical system 3R is set larger than the front side phase difference value of the O-plate 54 in the green light image forming optical system 3G. Accordingly, as shown in FIG. 10B, when the movement distance from the point A to the point B is increased such that the point C does not pass through the axis S2 and is positioned on the axis S2, the movement distance from the point D to the point E is similarly increased, and thus it is possible to match the point E with the point A. In such a manner, it is possible to sufficiently suppress the black floating caused by the red light image forming optical system 3R.

Figure 11B:
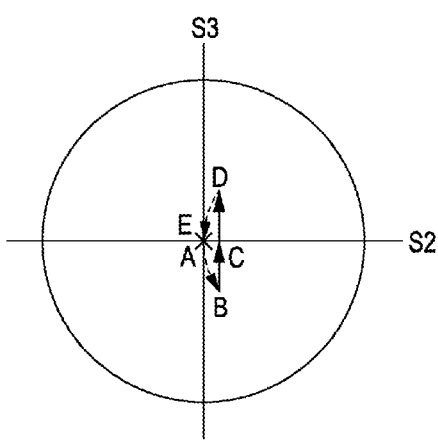

The front side phase difference value of the O-plate 54 in the image forming optical system 3B is set smaller than the front side phase difference value of the O-plate 54 in the green light image forming optical system 3G. Accordingly, as shown in FIG. 11B, when the movement distance from the point A to the point B is decreased such that the point C is positioned on the axis S2, the movement distance from the point D to the point E is similarly decreased, and thus it is possible to match the point E with the point A. In such a manner, it is possible to sufficiently suppress the black floating caused by the blue light image forming optical system 3B.

According to the projector 1 of the embodiment, as described above, as for the front side phase difference value of the O-plate 54 in the green light image forming optical system 3G, the front side phase difference value of the O-plate 54 in the red light image forming optical system 3R is set to be large, the front side phase difference value of the O-plate 54 in the blue light image forming optical system 3B is set to b small, thus the black floating caused by all the image forming optical systems 3R, 3G, and 3B is sufficiently suppressed, and it is possible to further improve the contrast than in the related art.

The inventor performed a simulation of contrast change when the front side phase difference value of the O-plate was changed, to actually prove the effect of the embodiment.

As the conditions of the simulation, the cell thickness of the liquid crystal light valve was 2.4 μm, the retardation (Δn·d) of the liquid crystal layer was 0.29, the wavelength dispersion of the liquid crystal layer was 1.08, the pre-tilt angle of the liquid crystal layer was 4.5°, and the wavelength dispersion of the O-plate was 1.15. The result is shown in Table 1.

TABLE 1

|  | Red | Green | Blue |
|---|---|---|---|
| Front Side Phase Difference Value (nm) | 15.4 | 15.0 | 14.1 |
| Slow Phase Axis Angle θ (°) | 3 | 3 | 3 |
| CR when Front Side Phase Difference Value is same (%) | 99 | 100 | 91 |
| CR when Front Side Phase Difference Value is different (%) | 100 | 100 | 100 |

As shown in Table 1, the angle θ by the slow phase axis of the O-plate with respect to the transmission axis of the PBS was 3°, the front side phase differences value of the O-plates of all the image forming optical systems was unified to 15.0 nm, and the contrast in the green light image forming optical system was 100. In this case, the contrast in the red light image forming optical system was decreased to 99 and the contrast in the blue light image forming optical system was decreased to 91. On the contrary, when the front side phase difference value of the O-plate in the red light image forming optical system is 15.4 nm, the front side phase difference value of the O-plate in the green light image forming optical system is 15.0 nm, and the front side phase difference value of the O-plate in the blue light image forming optical system is 14.1 nm, the contrast in all the image forming optical systems can be 100.

Second Embodiment

Hereinafter, a second embodiment of the invention will be described with reference to FIG. 12 to FIG. 14B. A basic configuration of a projector of the embodiment is the same as that of the first embodiment, and only the method of the phase difference compensation method in the image forming optical systems is different from that of the first embodiment. Accordingly, hereinafter, only this part will be described.

In the embodiment, there is a difference in the orientation angle of the slow phase axis of the O-plate 54 of the phase difference compensation plate 12 in the image forming optical systems 3R, 3G, and 3B. Herein, the orientation angle of the slow phase axis of the O-plate 54 means an angle formed by the slow phase axis of the O-plate 54 with respect to the transmission axis of the PBS 10, and is merely referred to as a slow phase axis angle in the following description. Specifically, the slow phase axis angle of the O-plate 54 in the red light image forming optical system 3R is set to, for example, 9.4°. The slow phase axis angle of the O-plate 54 in the green light image forming optical system 3G is set to, for example, 9.1°. The slow phase axis angle of the O-plate 54 in the blue light image forming optical system 3B is set to, for example, 8.5°.

Figure 13A:
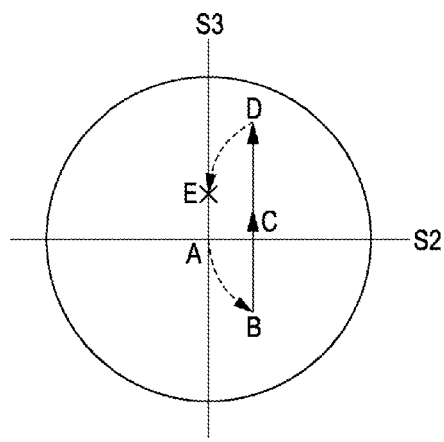
FIG. 13A and FIG. 13B are diagrams illustrating change of a polarization state of the Poincare sphere in a red light phase difference compensation plate.

For example, it is assumed that optimization of the phase difference compensation by the O-plate 54 is performed to be the ideal state as the standard of the green light, and the slow phase axis angle of the O-plate 54 in the red light image forming optical system 3R is matched with the slow phase axis angle of the O-plate 54 in the green light image forming optical system 3G. In this case, as shown in FIG. 13A, in the movement distance from the point A to the point B by the operation of the O-plate 54 on the Poincare sphere, the wavelength of red is longer than the wavelength of green, the influences of the wavelength dispersion overlap with each other in the refractive index anisotropy of the O-plate 54, and the movement distance becomes shorter than that of the green light. The movement distance from the point B to the point C by the operation of the liquid crystal layer 33 and the movement distance from the point C to the point D become longer than the case of the green light. However, since it is not the optimal value, the destination point of the point C is not the optimal value as shown in FIG. 13A. The movement distance from the point D to the point E by the operation of the O-plate 54 becomes shorter than that of the green light. As a result, in the case of the red light, the point E does not return to the position of the point A. Accordingly, in this state, the black floating is not suppressed, and the contrast of display is decreased.

FIG. 12 to FIG. 14B described hereinafter show circles by projecting the sphere surface onto the S2-S3 plane, as viewing the Poincare sphere in the direction of the axis S1.

Figure 14A:
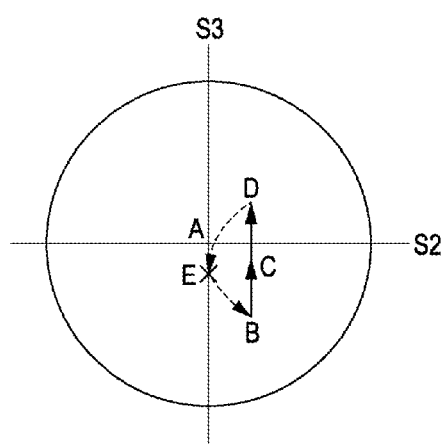
FIG. 14A and FIG. 14B are diagrams illustrating change of a polarization state of the Poincare sphere in a red light phase difference compensation plate.

It is assumed that the slow phase axis angle of the O-plate 54 in the blue light imaging forming optical system 3B is matched with the slow phase axis angle of the O-plate 54 in the green light image forming optical system 3G. In this case, as shown in FIG. 14A, the movement distance from the point A to the point B by the operation of the O-plate 54 on the Poincare sphere becomes longer than the case of the green light. Then, the movement distance from the point B to the point C by the liquid crystal layer 33 and the movement distance from the point C to the point D become longer than the case of the green light. However, since it is not the optimal value, the destination point of the point C is not the optimal value as shown in FIG. 14A. The movement distance from the point D to the point E by the operation of the O-plate 54 becomes longer than the case of the green light. As a result, in the case of the blue light, the point E does not return to the position of the point A. Accordingly, in this state, the black floating is not suppressed, and the contrast of display is decreased.

Figure 12:
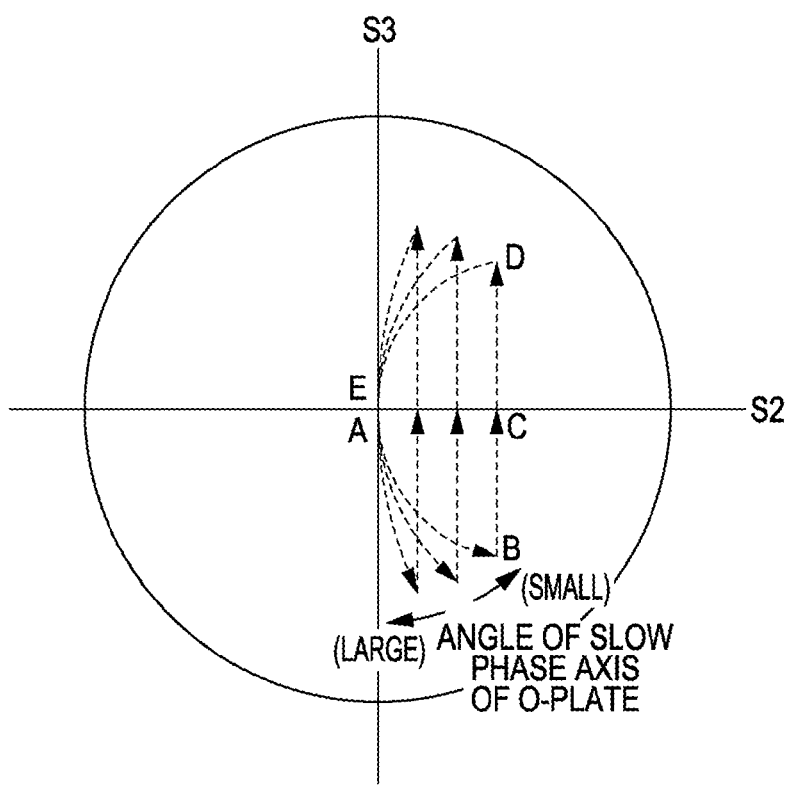
FIG. 12 is a front view illustrating a Poincare sphere viewed in an S1 axis direction in a second embodiment of the invention, and is a diagram illustrating change of a polarization state of light of the Poincare sphere when a slow phase axis angle of the phase difference compensation plate is changed.

Herein, when the O-plate 54 is rotated in the plane and is changed in a direction of increasing the slow phase axis angle of the O-plate 54, as shown in FIG. 12, the curve connecting between the point A and the point B and the curve connecting between the point D and the point E are changed to a shape of longitudinally extending in the direction of the axis S3. Meanwhile, when the O-plate 54 is rotated in the plane and is changed in a direction of decreasing the slow phase axis angle of the O-plate 54, the curve connecting between the point A and the point B and the curve connecting between the point D and the point E are changed to a shape of closing to the direction (the transverse direction in FIG. 12) of the axis S2.

Figure 13B:
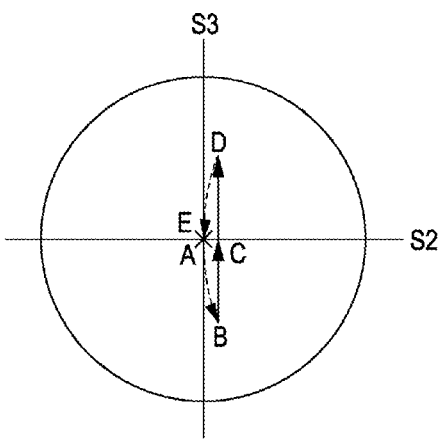

According to the phenomenon described above, the slow phase axis angle of the O-plate 54 in the red light image forming optical system 3R is set larger than the slow phase axis angle of the O-plate 54 in the green light image forming optical system 3G. Accordingly, as shown in FIG. 13B, when the shape of the curve connecting between the point A and the point B and the shape of the curve connecting between the point D and the point E are changed such that the point C does not pass through the axis S2 and is positioned on the axis S2, it is possible to match the point E with the point A. In such a manner, it is possible to sufficiently suppress the black floating caused by the red light image forming optical system 3R.

Figure 14B:
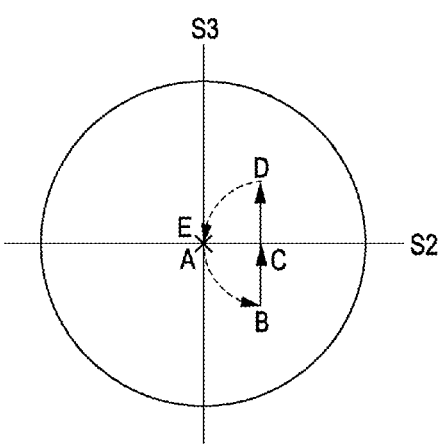

The slow phase axis angle of the O-plate 54 in the blue light image forming optical system 3B is set smaller than the slow phase axis angle of the O-plate 54 in the green light image forming optical system 3G. Accordingly, as shown in FIG. 14B, when the shape of the curve connecting between the point A and the point B and the shape of the curve connecting between the point D and the point E are changed such that the point C is positioned on the axis S2, it is possible to match the point E with the point A. In such a manner, it is possible to sufficiently suppress the black floating caused by the blue light image forming optical system 3B.

According to the projector 1 of the embodiment, as described above, as for the slow phase axis angle of the O-plate 54 in the green light image forming optical system 3G, the slow phase axis angle of the O-plate 54 in the red light image forming optical system 3R is set to be large, the slow phase axis angle of the O-plate 54 in the blue light image forming optical system 3B is set to b small, thus the black floating caused by all the image forming optical systems 3R, 3G, and 3B is sufficiently suppressed, and it is possible to further improve the contrast than in the related art. In the case of the embodiment, since it is not necessary to change the front side phase difference value of the O-plate 54, it is possible to use the same phase difference compensation plate 12 in all the image forming optical systems 3R, 3G, and 3B. When only the angle (the rotation angle in the plane) of the phase difference compensation plate 12 is changed to fix the phase difference compensation plate 12 to the case 50, it is possible to easily realize the embodiment.

The inventor performed a simulation of contrast change when the slow phase axis angle of the O-plate was changed, to actually prove the effect of the embodiment.

As the conditions of the simulation, the cell thickness of the liquid crystal light valve was 2.4 µm, the retardation (Δn·d) of the liquid crystal layer was 0.29, the wavelength dispersion of the liquid crystal layer was 1.08, the pre-tilt angle of the liquid crystal layer was 4.5°, and the wavelength dispersion of the O-plate was 1.15. The result is shown in Table 2.

TABLE 2

| | Red | Green | Blue |
|---|---|---|---|
| Front Side Phase Difference Value (nm) | 5 | 5 | 5 |
| Slow Phase Axis Angle θ (°) | 9.4 | 9.1 | 8.5 |
| CR when Slow Phase Axis Angle is same (%) | 99 | 100 | 91 |
| CR when Slow Phase Axis Angle is different (%) | 100 | 100 | 100 |

As shown in Table 2, the front side phase difference value of the O-plate was uniformly 5 nm, the slow phase axis angle of the O-plates of all the image forming optical systems was unified to 9.1°, and the contrast in the green light image forming optical system was 100. In this case, the contrast in the red light image forming optical system was decreased to 99 and the contrast in the blue light image forming optical system was decreased to 91. On the contrary, when the slow phase axis angle of the O-plate in the red light image forming optical system is 9.4°, the slow phase axis angle of the O-plate in the green light image forming optical system is 9.1°, and the slow phase axis angle of the O-plate in the blue light image forming optical system is 8.5°, the contrast in all the image forming optical systems can be 100.

The technical scope of the invention is not limited to the embodiments described above, and the invention may be variously modified within the scope which does not deviate from the concept of the invention. For example, in the first embodiment, only the front side phase difference value of the O-plate in the image forming optical systems was different. In the second embodiment, only the slow phase axis angle of the O-plate in the image forming optical systems was different. Combining such configurations, both of the front side phase difference value and the slow phase axis angle of the O-plate of the image forming optical systems may be different. With such a configuration, even when the phase difference compensation is not sufficient only by changing any one of the front side phase difference value and the slow phase axis angle of the O-plate in a practically adjustable range, it is possible to sufficiently suppress the black floating and to improve the contrast.

Figure 5B:
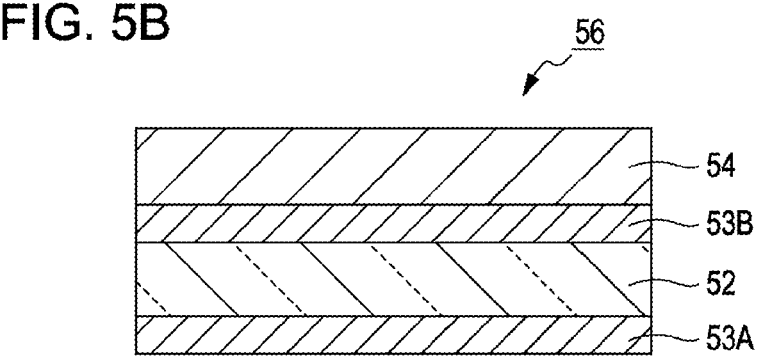

In the embodiment, the configuration shown in FIG. 5A was used as the phase difference compensation plate 12, but as shown in FIG. 5B, the phase difference compensation plate 56 in which the C-plate (the negative C-plate) 53A is formed on one face of the substrate 52 and the C-plate (the negative C-plate) 53B and the O-plate 54 are laminated and formed on the other face in this order may be used.

In this case, the C-plate 53A and the C-plate 53B are formed on the substrate 52 such that the optical characteristics in which the C-plate (the negative C-plate) 53A and the C-plate (the negative C-plate) 53B are combined are the same as those of the C-plate 53 shown in FIG. 5A. Accordingly, the C-plate 53A and the C-plate 53B may be considered as one C-plate 53. Although not shown, the phase difference compensation plate in which the C-plate and the O-plate in the FIG. 5B are replaced, the C-plate and the O-plate are laminated and formed on one face of the substrate 52 in this order, and the O-plate is formed on the other face may be used. In this case, the optical characteristics in which two O-plates with the substrate 52 interposed therebetween are combined are the same as those of the O-plate 54 shown in FIG. 5A.

Figure 5C:
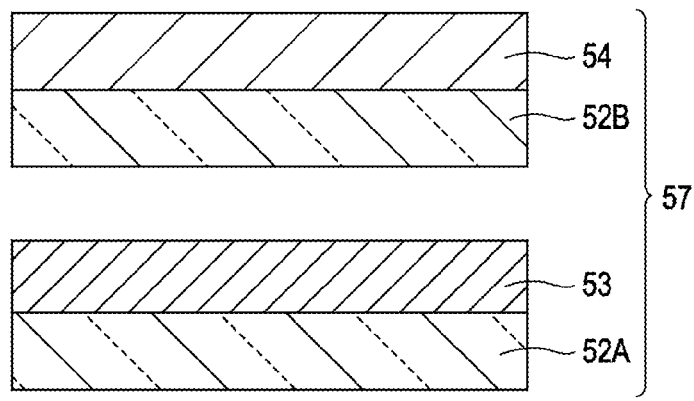

In addition, instead of the phase difference compensation plate 12 in which the C-plate 53 and the O-plate 54 are formed on one substrate 52 and they are integrated, a phase difference compensation plate in which the C-plate 53 is formed on the substrate 52A and the O-plate 54 is formed on the other substrate 52B may be used as shown in FIG. 5C. That is, one phase difference compensation plate 57 by combining them may be used.

In addition, materials, shapes, number, and disposition of various constituent members of the projector are not limited to the embodiment, and may be variously modified.

The entire disclosure of Japanese Patent Application No. 2011-010575, filed Jan. 21, 2011 is expressly incorporated by reference herein.

What is claimed is:

1. A projector comprising:
   a lighting device that emits light;
   a plurality of vertical alignment mode reflex-type liquid crystal light valves that are provided in correspondence with each of a plurality of different colors, the plurality of vertical alignment mode reflex-type liquid crystal light valves modulating the light of each of the plurality of different colors in a liquid crystal layer, the plurality of liquid crystal light valves including a red light modulating liquid crystal light valve, a green light modulating liquid crystal light valve, and a blue light modulating liquid crystal light valve;
   a separate phase difference compensation plate that is provided at a light incident side of each liquid crystal light valve, each phase difference compensation plate including a first phase difference compensation layer having negative uniaxial refractive index anisotropy in which an optical axis is taken along a thickness direction, and a second phase difference compensation layer having biaxial refractive index anisotropy;

a color synthesizing optical system that synthesizes the color light modulated by the plurality of liquid crystal light valves;

a projection optical system that projects the light synthesized by the color synthesizing optical system, to a projection target face; and a case that is provided with each liquid crystal light valve, each case including a first side having an opening portion, wherein a front side phase difference value of the phase difference compensation plate corresponding to at least one liquid crystal light valve of the plurality of liquid crystal light valves is different from a front side phase difference value of the phase difference compensation plate corresponding to the other liquid crystal light valves, the first side of the case corresponding to one of the liquid crystal light valves is provided between the one of the liquid crystal light valves and the phase difference compensation plate so as to be parallel to each other, the liquid crystal layer of the one of the liquid crystal light valves is overlapped with the opening portion of the first side of the case, and the front side phase difference value of the phase difference compensation plate corresponding to the red light modulating liquid crystal light valve is larger than the front side phase difference value of the phase difference compensation plate corresponding to the green light modulating liquid crystal light valve, and the front side phase difference value of the phase difference compensation plate corresponding to the blue light modulating liquid crystal light valve is smaller than the front side phase difference value of the phase difference compensation plate corresponding to the green light modulating liquid crystal light valve.

2. A projector comprising:

a lighting device that emits light;

a plurality of vertical alignment mode reflex-type liquid crystal light valves that are provided in correspondence with each of a plurality of different colors, the plurality of vertical alignment mode reflex-type liquid crystal light valves modulating the light of each of the plurality of different colors in a liquid crystal layer, the plurality of liquid crystal light valves including a red light modulating liquid crystal light valve, a green light modulating liquid crystal light valve, and a blue light modulating liquid crystal light valve;

a separate phase difference compensation plate that is provided at a light incident side of each liquid crystal light valve, each phase difference compensation plate including a first phase difference compensation layer having negative uniaxial refractive index anisotropy in which an optical axis is taken along a thickness direction, and a second phase difference compensation layer having biaxial refractive index anisotropy;

a color synthesizing optical system that synthesizes the color light modulated by the plurality of liquid crystal light valves;

a projection optical system that projects the light synthesized by the color synthesizing optical system, to a projection target face; and a case that is provided with each liquid crystal light valve, each case including a first side having an opening portion, wherein an orientation angle of a slow phase axis in an in-plane orientation of the phase difference compensation plate corresponding to at least one liquid crystal light valve of the plurality of liquid crystal light valves is different from an orientation angle of a slow phase axis in an in-plane orientation of the phase difference compensation plate corresponding to the other liquid crystal light valves, the first side of the case corresponding to one of the liquid crystal light valves is provided between the one of the liquid crystal light valves and the phase difference compensation plate so as to be parallel to each other, the liquid crystal layer of the one of the liquid crystal light valves is overlapped with the opening portion of the first side of the case, and a front side phase difference value of the phase difference compensation plate corresponding to the red light modulating liquid crystal light valve is larger than a front side phase difference value of the phase difference compensation plate corresponding to the green light modulating liquid crystal light valve, and a front side phase difference value of the phase difference compensation plate corresponding to the blue light modulating liquid crystal light valve is smaller than the front side phase difference value of the phase difference compensation plate corresponding to the green light modulating liquid crystal light valve.

3. The projector according to claim 2, wherein a polarized beam splitter having a predetermined transmission axis is provided between the lighting device and the phase difference compensation plate, and wherein an angle formed by the slow phase axis of the phase difference compensation plate corresponding to the red light modulating liquid crystal light valve and the transmission axis is larger than an angle formed by the slow phase axis of the phase difference compensation plate corresponding to the green light modulating liquid crystal light valve and the transmission axis, and an angle formed by the slow phase axis of the phase difference compensation plate corresponding to the blue light modulating liquid crystal light valve and the transmission axis is smaller than an angle formed by the slow phase axis of the phase difference compensation plate corresponding to the green light modulating liquid crystal light valve and the transmission axis.

4. The projector according to claim 1, wherein the first phase difference compensation layer is a multilayer film that includes a high refractive index layer and a low refractive index layer.

5. The projector according to claim 2, wherein the first phase difference compensation layer is a multilayer film that includes a high refractive index layer and a low refractive index layer.

6. The projector according to claim 1, wherein the second phase difference compensation layer is an oblique column-shaped structure film.

7. The projector according to claim 2, wherein the second phase difference compensation layer is an oblique column-shaped structure film.

8. The projector according to claim 1, wherein the phase difference compensation plate includes a substrate, the first phase difference compensation layer and the second phase difference compensation layer are formed over the substrate respectively.

9. The projector according to claim 2, wherein
the phase difference compensation plate includes a substrate,
the first phase difference compensation layer and the second phase difference compensation layer are formed over the substrate respectively.

10. The projector according to claim 1, wherein the case includes aluminum.

11. The projector according to claim 2, wherein the case includes aluminum.

12. The projector according to claim 1, wherein the first phase difference compensation layer is provided between the one of the liquid crystal light valves and the second phase difference compensation layer.

13. The projector according to claim 2, wherein the first phase difference compensation layer is provided between the one of the liquid crystal light valve and the second phase difference compensation layer.

* * * * *